United States Patent
Itokazu (10) Patent No.: US 11,826,845 B2
(45) Date of Patent: Nov. 28, 2023

(54) MULTI-WIRE ELECTRIC DISCHARGE MACHINE

(71) Applicant: Mitsubishi Electric Corporation, Tokyo (JP)

(72) Inventor: Atsushi Itokazu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/032,816

(22) PCT Filed: Apr. 12, 2021

(86) PCT No.: PCT/JP2021/015181
§ 371 (c)(1),
(2) Date: Apr. 20, 2023

(87) PCT Pub. No.: WO2022/219678
PCT Pub. Date: Oct. 20, 2022

(65) Prior Publication Data
US 2023/0311225 A1    Oct. 5, 2023

(51) Int. Cl.
*B23H 7/20* (2006.01)
*B23H 7/10* (2006.01)
(Continued)

(52) U.S. Cl.
CPC ............... *B23H 7/20* (2013.01); *B23H 7/10* (2013.01); *B23H 7/16* (2013.01); *G05B 19/182* (2013.01); *G05B 2219/45221* (2013.01)

(58) Field of Classification Search
CPC ... B23H 7/20; B23H 7/10; B23H 7/16; G05B 19/182; G05B 2219/45221
See application file for complete search history.

(56) References Cited

U.S. PATENT DOCUMENTS

D668,277 S  * 10/2012  Miyake ............ D15/127
D668,278 S  * 10/2012  Miyake ............ D15/127
(Continued)

FOREIGN PATENT DOCUMENTS

JP       2014-8592 A    1/2014
JP       5863277 B2     2/2016
(Continued)

OTHER PUBLICATIONS

International Search Report and Written Opinion dated Jul. 6, 2021, received for PCT Application PCT/JP2021/015181, filed on Apr. 12, 2021, 9 pages including English Translation.
(Continued)

*Primary Examiner* — Ramesh B Patel
(74) *Attorney, Agent, or Firm* — XSENSUS LLP (57) ABSTRACT

A multi-wire electric discharge machine includes: a plurality of cutting wire sections arranged in parallel in such a way as to face a workpiece, a wire electrode being wound around guide rollers to form the cutting wire sections; a drive unit that adjusts relative distances between the workpiece and the cutting wire sections; a machining power supply that applies pulse voltages between the workpiece and the cutting wire sections; a machining-state detection device that detects machining states in the cutting wire sections; and a machining control device that controls the drive unit and the machining power supply, in which when values indicating the machining states exceed a threshold value, the machining control device outputs, to the machining power supply, commands to apply the pulse voltages according to a machining condition for avoiding breakage of the wire electrode.

9 Claims, 5 Drawing Sheets

(51) Int. Cl.
　　　*B23H 7/16*　　　(2006.01)
　　　*G05B 19/18*　　(2006.01)

(56) References Cited

U.S. PATENT DOCUMENTS

| | | | |
|---|---|---|---|
| 11,230,776 B2* | 1/2022 | Mills | H02S 40/38 |
| 11,471,965 B2* | 10/2022 | Takemoto | G05B 19/182 |
| 11,534,847 B2* | 12/2022 | Watanabe | B23H 7/065 |
| 11,669,077 B2* | 6/2023 | Domori | G06N 3/006 |
| | | | 700/97 |
| 11,724,324 B2* | 8/2023 | Chu | B23H 7/20 |
| | | | 700/162 |
| 2017/0060105 A1* | 3/2017 | Onodera | B23H 7/20 |
| 2017/0104426 A1* | 4/2017 | Mills | H01L 31/0549 |
| 2018/0281091 A1 | 10/2018 | Nakashima | |
| 2020/0002828 A1* | 1/2020 | Mills | H05H 1/01 |
| 2020/0150632 A1* | 5/2020 | Takemoto | B23H 7/102 |
| 2020/0290142 A1* | 9/2020 | Chu | B23H 1/022 |
| 2022/0098744 A1* | 3/2022 | Mills | C25B 13/04 |
| 2023/0065726 A1* | 3/2023 | Itokazu | B23H 1/028 |
| 2023/0241698 A1* | 8/2023 | Miyake | B23H 7/107 |
| | | | 219/69.12 |

FOREIGN PATENT DOCUMENTS

| | | |
|---|---|---|
| JP | 2017-42882 A | 3/2017 |
| JP | 2018-169934 A | 11/2018 |
| JP | 2020-075321 A | 5/2020 |
| JP | 6791462 B1 | 11/2020 |
| WO | 2021/186614 A1 | 9/2021 |

OTHER PUBLICATIONS

Decision to Grant dated Nov. 9, 2021, received for JP Application 2021-556251, 5 pages including English Translation.

* cited by examiner

MULTI-WIRE ELECTRIC DISCHARGE MACHINE

CROSS-REFERENCE TO RELATED APPLICATION

The present application is based on PCT filing PCT/JP2021/015181, filed Apr. 12, 2021, the entire contents of which are incorporated herein by reference.

FIELD

The present disclosure relates to a multi-wire electric discharge machine that cuts a workpiece with a plurality of cutting wires.

BACKGROUND

A multi-wire electric discharge machine is an apparatus that collectively cuts a plurality of thin plates from an ingot-like workpiece. The multi-wire electric discharge machine includes a plurality of cutting wires arranged in parallel in such a way as to face a workpiece. The plurality of cutting wires is formed of a single wire electrode wound around a plurality of guide rollers. The multi-wire electric discharge machine collectively cuts a plurality of thin plates from an ingot-like workpiece by applying pulse voltages between the plurality of cutting wires and the workpiece to cause electric discharge.

Throughput is important in multi-wire electric discharge machining. In order to obtain a high throughput in multi-wire electric discharge machining, it is necessary to increase machining speed while avoiding wire breakage.

In order to prevent a machining process from becoming unstable, a wire breakage prediction device described in Patent Literature 1 predicts wire breakage on the basis of correlations between data indicating machining states and states in which wire is not broken.

CITATION LIST

Patent Literature

Patent Literature 1: Japanese Patent Application Laid-open No. 2020-75321

SUMMARY

Technical Problem

When the technique of Patent Literature 1 above is applied to multi-wire electric discharge machining, it is necessary to arrange a plurality of wire breakage prediction devices in performing multi-wire electric discharge machining. However, in a multi-wire electric discharge machine, a plurality of cutting wires is formed of a single wire electrode, and adjacent cutting wires are electrically connected. Therefore, when the technique of Patent Literature 1 above is applied to multi-wire electric discharge machining, voltage and current in each cutting wire are affected by adjacent cutting wires, so that it is difficult to predict wire breakage. Accordingly, when applied to multi-wire electric discharge machining, the technique of Patent Literature 1 above has a problem in that it is difficult to increase machining speed while preventing wire breakage, and that it is thus difficult to obtain a high throughput.

The present disclosure has been made in view of the above, and an object of the present disclosure is to obtain a high throughput in multi-wire electric discharge machining.

Solution to Problem

In order to solve the above-described problem and achieve the object, a multi-wire electric discharge machine of the present disclosure includes: a plurality of cutting wire sections arranged in parallel in such a way as to face a workpiece, a wire electrode being wound around a plurality of guide rollers to form the cutting wire sections; and a drive unit that adjusts relative distances between the workpiece and the cutting wire sections. The multi-wire electric discharge machine of the present disclosure also includes: a machining power supply that applies pulse voltages between the workpiece and the cutting wire sections; a machining-state detection device that detects machining states in the cutting wire sections; and a machining control device that controls the drive unit and the machining power supply. When values indicating the machining states exceed a threshold value, the machining control device outputs, to the machining power supply, commands to apply the pulse voltages according to a machining condition for avoiding breakage of the wire electrode.

Advantageous Effects of Invention

The multi-wire electric discharge machine according to the present disclosure has an effect of enabling a high throughput to be obtained.

DESCRIPTION OF EMBODIMENTS

Hereinafter, a multi-wire electric discharge machine according to an embodiment of the present disclosure will be described in detail with reference to the drawings.

Embodiment

Figure 1:
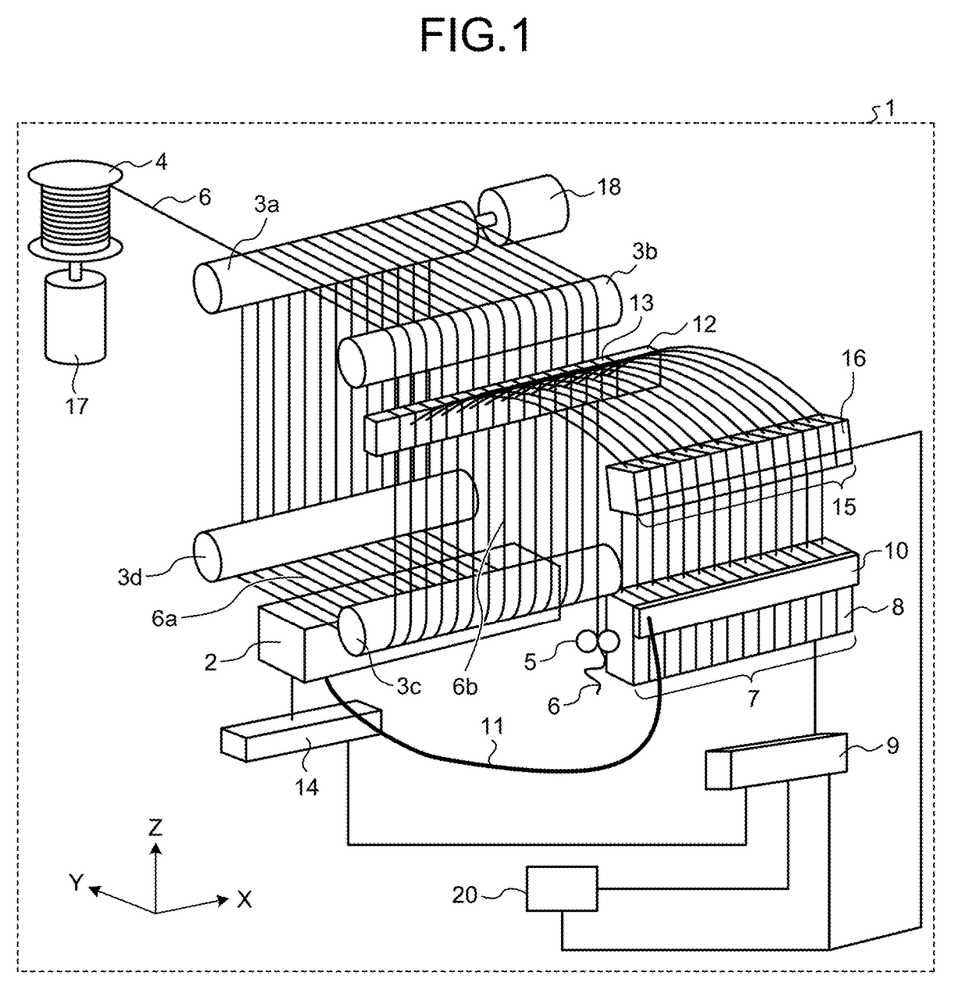
FIG. 1 is a perspective view of a multi-wire electric discharge machine according to an embodiment, in which a configuration of the multi-wire electric discharge machine has been illustrated.

FIG. 1 is a perspective view of a multi-wire electric discharge machine according to an embodiment, in which a configuration of the multi-wire electric discharge machine has been illustrated. Note that, in the following description, a vertical direction is defined as a Z-axis direction, and two axes orthogonal to each other in a horizontal plane are defined as an X-axis and a Y-axis. In addition, an axis orthogonal to the X-axis and the Y-axis is defined as a Z-axis. For example, the minus Z direction is the vertical direction.

A multi-wire electric discharge machine 1 is an apparatus that cuts a workpiece 2 into a plurality of pieces by electric discharge. For example, the multi-wire electric discharge machine 1 according to the embodiment controls electrode gap distance in a frequency band of several tens of Hz, and controls a voltage application command to be issued to a machining power supply 7 in a frequency band of about several kHz to several MHz. As a result, the multi-wire electric discharge machine 1 prevents wire breakage by detecting a sign of wire breakage in electric discharge machining which is an electric phenomenon of about several kHz to several MHz.

By controlling a voltage application command to be issued to the machining power supply 7, the multi-wire electric discharge machine 1 performs electric discharge machining while preventing wire breakage due to instability of a machining process or mechanical aging. The multi-wire electric discharge machine 1 includes a wire bobbin 4 and a wire bobbin drive unit 17. The wire bobbin 4 supplies a wire electrode 6. The wire bobbin drive unit 17 drives the wire bobbin 4.

In addition, the multi-wire electric discharge machine 1 includes wire ejection rollers 5, guide rollers 3a, 3b, 3c, and 3d, and a guide roller drive unit 18. The wire ejection rollers 5 eject the wire electrode 6 to the outside of the multi-wire electric discharge machine 1. The guide rollers 3a, 3b, 3c, and 3d are for causing the wire electrode 6 to appropriately travel. The guide roller drive unit 18 drives the guide roller 3a.

Furthermore, the multi-wire electric discharge machine 1 includes a power feeder 12 and a drive unit 14. The power feeder 12 supplies a voltage for machining to the wire electrode 6 by coming into contact with the wire electrode 6. The drive unit 14 drives, in the plus Z direction, a machining stage (not illustrated) on which the workpiece 2 can be placed. The multi-wire electric discharge machine 1 machines the workpiece 2 by moving the machining stage on which the workpiece 2 has been placed in the plus Z direction.

Moreover, the multi-wire electric discharge machine 1 includes the machining power supply 7 that applies a pulse voltage for machining (hereinafter, referred to as machining pulse voltage) between each cutting wire section 6a included in the wire electrode 6 and the workpiece 2 via the power feeder 12. The multi-wire electric discharge machine 1 also includes a cable 11 that connects the machining power supply 7 and the workpiece 2.

The multi-wire electric discharge machine 1 also includes a machining control device 9, a learning system 20, and a machining-state detection device 15. The machining control device 9 controls electric discharge machining. The learning system 20 generates a command signal for the machining control device 9. The machining-state detection device 15 detects a machining state in each cutting wire section 6a. The command signal to be sent from the learning system 20 to the machining control device 9 is a command signal specifying a target value to be described below.

The four columnar guide rollers 3a to 3d are separated from each other and arranged in parallel to axial directions. FIG. 1 illustrates a case where the guide rollers 3a to 3d are arranged in such a way as to extend in an X-axis direction.

Furthermore, the four guide rollers 3a to 3d are arranged such that the respective axes are located at apexes of a quadrangle in a plane (in a YZ-plane in FIG. 1) orthogonal to the axial directions.

Specifically, the four guide rollers 3a to 3d are provided as follows. The guide rollers 3a and 3b are located at highest positions in the Z-axis direction. The guide roller 3c is located below the guide roller 3b. The guide roller 3d is located below the guide roller 3a, side by side with the guide roller 3c. That is, a line connecting the guide rollers 3a and 3b and a line connecting the guide rollers 3c and 3d are parallel to a Y-axis direction, and a line connecting the guide rollers 3b and 3c and a line connecting the guide rollers 3d and 3a are parallel to the Z-axis direction. In addition, a large number of guide grooves for guiding the traveling of the wire electrode 6 are formed at specific intervals in the respective axial directions on the outer peripheries of the four guide rollers 3a to 3d.

With the configuration as described above, the single wire electrode 6 fed from the wire bobbin 4 is guided by the respective guide grooves of the guide rollers 3a, 3b, 3c, and 3d that rotate clockwise as viewed from the minus X direction in the illustrated example. The wire electrode 6 is wound around the four guide rollers 3a, 3b, 3c, and 3d multiple times at intervals corresponding to the specific intervals between the guide grooves. Then, the wire electrode 6 is ejected from the multi-wire electric discharge machine 1 by the wire ejection rollers 5. Here, portions of the wire electrode 6 stretched in parallel between the guide roller 3c and the guide roller 3d each serve as the cutting wire section 6a. That is, the cutting wire sections 6a refer to a plurality of cutting wires arranged in parallel in such a way as to face the workpiece 2. The plurality of cutting wires is formed of the wire electrode 6 wound around the plurality of guide rollers 3a to 3d. The cutting wire sections 6a of the wire electrode 6 cut the workpiece 2. The workpiece 2 has a columnar shape, and is disposed such that its axial direction is aligned with the X-axis direction.

Furthermore, in the illustrated example, the guide roller 3a is rotated by the guide roller drive unit 18, and the wire bobbin 4 is rotated by the wire bobbin drive unit 17 such that the tension of the wire electrode 6 is kept constant. In addition, the guide roller drive unit 18 and the wire bobbin drive unit 17 drive the guide roller 3a and the wire bobbin 4, respectively, so as to obtain a desired wire traveling speed.

The machining control device 9 outputs a position command (feed control command value) to the drive unit 14 as a drive unit. Thus, the drive unit 14 drives the machining stage in the Z-axis direction in accordance with the position command. As a result, the positional relationship between the workpiece 2 and the cutting wire sections 6a is relatively changed. That is, the drive unit 14 adjusts relative distances between the workpiece 2 and the cutting wire sections 6a.

Furthermore, the machining control device 9 applies a machining pulse voltage between each cutting wire section 6a and the workpiece 2 by outputting voltage application commands to a plurality of machining power supply units 8 included in the machining power supply 7. The voltage application command includes the amplitude of voltage, the frequency of machining pulse voltage, the on-pulse time of machining pulse voltage, and the like. The machining control device 9 controls the drive unit 14 in a first frequency band, and controls the machining power supply 7 in a second frequency band higher than the first frequency band.

The machining control device 9 controls the relative distances between the workpiece 2 and the cutting wire sections 6a by outputting the position command to the drive unit 14, and applies a machining pulse voltage between each cutting wire section 6a and the workpiece 2 to cause electric discharge. Thus, the machining control device 9 causes a plurality of thin plates to be cut from the workpiece 2.

The workpiece 2 is an ingot to be sliced into a plurality of thin plates. For example, the material of the workpiece 2 may be metal such as tungsten or molybdenum serving as a sputtering target, or may be ceramics such as polycrystalline silicon carbide to be used as various structural members. Furthermore, the material of the workpiece 2 may be single-crystal silicon serving as a semiconductor device wafer, or may be semiconductor material such as single-crystal silicon carbide, single-crystal gallium nitride, single-crystal gallium oxide, or single-crystal diamond. Alternatively, the material of the workpiece 2 may be solar cell material or the like, such as single-crystal silicon or polycrystalline silicon, serving as a solar cell wafer.

Among the materials of the workpiece 2 described above, metals have sufficiently low specific resistance. Therefore, electric discharge machining can be applied to metals with no difficulty. Meanwhile, electric discharge machining can be performed on a semiconductor material and a solar cell material with a sufficiently low specific resistance, that is, a specific resistance of about 100 Ω2 cm or less, desirably 10 Ω2 cm or less.

Therefore, a metal or a material with a specific resistance that is equivalent to or higher than the specific resistance of metal and 100 Ω2 cm or less, desirably 10 Ω2 cm or less, is suitable for the workpiece 2. In particular, a semiconductor material and a solar cell material with a specific resistance in the above-described range are suitable for the workpiece 2.

A machining fluid is supplied to each of electrode gaps between the workpiece 2 and a plurality of the cutting wire sections 6a by spraying or immersion, as in a so-called single-type wire electric discharge machine.

The machining-state detection device 15 is installed on wires connecting the power feeder 12 and the machining power supply 7. The machining-state detection device 15 detects a machining state in each cutting wire section 6a. Specifically, the machining-state detection device 15 detects a machining state in each cutting wire section 6a by monitoring, via the power feeder 12, the state of voltage (hereinafter, referred to as gap voltage) applied to the electrode gap between the workpiece 2 and each cutting wire section 6a, a current state, the number of times electric discharge occurs per unit time, the number of times a short circuit occurs per unit time, and the machining pulse voltage that is an output voltage of the machining power supply 7. The machining state to be detected by the machining-state detection device 15 may be machining energy calculated from a current value indicating a current state.

In addition, the machining-state detection device includes a plurality of machining-state detection units 16 such that there is a one-to-one correspondence between the machining-state detection units 16 and the cutting wire sections 6a, and detects a machining state separately for each cutting wire section 6a.

The machining control device 9 receives, from the machining-state detection device 15, machining states of the electrode gaps between the workpiece 2 and the cutting wire sections 6a, and performs feed control in a cutting direction so as to maintain appropriate electrode gap distances between the workpiece 2 and the cutting wire sections 6a. Specifically, the machining control device 9 gives a position command to the drive unit 14 so that the machining state (for example, machining voltage) in each cutting wire section 6a acquired from the machining-state detection device 15 approaches a set value. At this time, the present embodiment is based on the assumption that the machining control device 9 can monitor machining speed that is machining distance per unit time.

In addition, the machining control device 9 monitors the machining state of an electric discharge machining process, and generates a voltage application command to be issued to the machining power supply 7 as appropriate. Specifically, the machining control device 9 generates a voltage application command so that the machining state (for example, machining current) in each cutting wire section 6a acquired from the machining-state detection device 15 approaches a target value. As a result, the multi-wire electric discharge machine 1 can prevent the machining process from transiently becoming unstable due to concentrated electric discharge, a short circuit, or the like.

In addition, the machining control device 9 has a threshold value for avoiding wire breakage, and switches a machining condition to a machining condition for avoiding wire breakage when a machining state exceeds the threshold value for avoiding wire breakage due to accidental instability of the machining process of each cutting wire section 6a. Specifically, when a value indicating a machining state exceeds the threshold value, the machining control device 9 outputs, to the machining power supply 7, a command to apply a machining pulse voltage according to a machining condition for avoiding breakage of the wire electrode 6. Thus, the multi-wire electric discharge machine 1 can prevent wire breakage due to a sudden change in the machining process. Note that the machining condition for avoiding wire breakage is a machining condition under which machining current is lower than under a normal cutting machining condition.

Furthermore, the machining control device 9 changes the target value based on a facing width of the workpiece 2 and the cutting wire section 6a. The facing width refers to a width of the workpiece 2 facing the cutting wire section 6a when the cutting wire section 6a is viewed from the minus X direction. FIG. 1 illustrates a case where the workpiece 2 is a quadrangular prism, and thus the facing width does not change even when the cutting wire section 6a proceeds with machining of the workpiece 2. For example, in a case where the workpiece 2 is a cylinder, the facing width changes as the cutting wire section 6a proceeds with machining of the workpiece 2.

The machining control device 9 stores correspondence relationship information indicating correspondence relationships between facing widths and target values, and changes a target value based on the correspondence relationship information and a facing width. In the multi-wire electric discharge machine 1, the machining control device 9 changes the target value based on the facing width. Therefore, the multi-wire electric discharge machine 1 can control machining according to the facing width such that machining energy density becomes uniform, and thus can reduce the risk of wire breakage.

The machining power supply 7 generates a machining pulse voltage to be applied to the electrode gap between the workpiece 2 and each cutting wire section 6a on the basis of the voltage application command from the machining control device 9. The machining power supply 7 generates a machining pulse voltage, for example, by a switching power supply system. The machining power supply 7 includes the plurality of machining power supply units 8 that can apply machining pulse voltage independently of each other. Then, a ground electrode 10 is provided across the plurality of machining power supply units 8 of the machining power supply 7. Each ground line of the plurality of machining power supply units 8 is connected to the ground electrode 10, and the ground electrode 10 is connected to the workpiece 2 by the cable 11. Note that the machining power supply 7 can appropriately invert the polarity of the machining pulse voltage to be generated, as necessary.

The power feeder 12 includes a plurality of power feeder units 13 insulated from each other. In the illustrated example, portions of the wire electrode 6 stretched in parallel between the guide rollers 3b and 3c each serve as a power-supply wire section 6b from which machining pulse voltage is supplied. Each power feeder unit 13 is disposed in sliding contact with corresponding one of the power-supply wire sections 6b in one-to-one correspondence. Each power feeder unit 13 independently feeds a machining pulse voltage generated by corresponding one of the machining power supply units 8 to the corresponding one of the power-supply wire sections 6b. Therefore, the machining pulse voltage is independently applied to each cutting wire section 6a from the corresponding one of the machining power supply units 8.

In the present embodiment, the plurality of power feeder units 13 is connected to output ends of the plurality of machining power supply units 8 via the plurality of machining-state detection units 16, as described above. That is, the power feeder units 13 are connected to the output ends of the corresponding machining power supply units 8 via the corresponding machining-state detection units 16.

As a result, respective machining pulse voltages independently output from the plurality of machining power supply units 8 are applied to electrode gaps between the corresponding cutting wire sections 6a and the workpiece 2 via the corresponding machining-state detection units 16, the corresponding power feeder units 13, and the corresponding power-supply wire sections 6b having a specific length. That is, a machining pulse voltage output from one of the machining power supply units 8 is applied to an electrode gap between corresponding one of the cutting wire sections 6a and the workpiece 2 via corresponding one of the machining-state detection units 16, corresponding one of the power feeder units 13, and corresponding one of the power-supply wire sections 6b.

The learning system 20 generates a command signal for the machining control device 9 based on the machining state in each cutting wire section 6a acquired from the machining-state detection device 15, the voltage application command output from the machining control device 9 to the machining power supply 7, the position command output from the machining control device 9 to the drive unit 14, and the facing width of the workpiece 2 and the cutting wire section 6a.

The facing width of the workpiece 2 and the cutting wire section 6a is detected by a cutting width detection device 21 to be described below. The cutting width detection device 21 estimates the facing width that is the width of the workpiece 2 facing the cutting wire section 6a while being machined, on the basis of a position at which machining ends, a current machining position, a machining state output by the machining-state detection device 15, information input by an operator, and the like.

Figure 2:
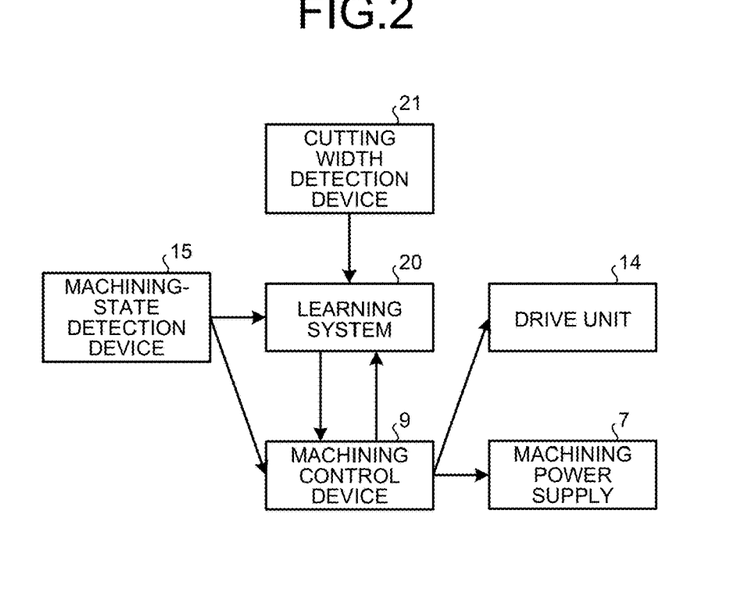
FIG. 2 is a diagram for describing the flow of signals in the multi-wire electric discharge machine according to the embodiment.

FIG. 2 is a diagram for describing the flow of signals in the multi-wire electric discharge machine according to the embodiment. FIG. 2 illustrates the flow of signals in the machining-state detection device 15, the learning system 20, the machining control device 9, the drive unit 14, the machining power supply 7, and the cutting width detection device 21.

The machining-state detection device 15 detects a machining state in each cutting wire section 6a, and outputs the detected machining states to the learning system 20 and the machining control device 9. The cutting width detection device 21 detects facing widths of the workpiece 2 and the cutting wire sections 6a, and outputs the detected facing widths to the learning system 20.

The learning system 20 includes a learning device 50 and an inference device 60 to be described below. The learning device 50 receives the machining states from the machining-state detection device 15, and receives the facing widths from the cutting width detection device 21. In addition, the learning device 50 receives, from the machining control device 9, control parameter change information on a control parameter to be used by the machining control device 9. The learning device 50 generates a learned model for inferring control parameter change information from a machining state and a facing width, on the basis of the machining states, the facing widths, and the control parameter change information. The control parameter change information refers to a value of a changed control parameter.

The inference device 60 receives a machining state from the machining-state detection device 15, and receives a facing width from the cutting width detection device 21. The inference device 60 infers control parameter change information corresponding to the machining state and the facing width, based on the machining state, the facing width, and the learned model. The inference device 60 outputs the control parameter change information to the machining control device 9.

The machining control device 9 outputs voltage application commands to the plurality of machining power supply units 8 included in the machining power supply 7. When the control parameter change information is sent from the inference device 60, the machining control device 9 outputs a voltage application command corresponding to the control parameter change information to each machining power supply unit 8. The machining control device 9 also outputs a position command to the drive unit 14.

The drive unit 14 receives the position command from the machining control device 9, and drives the machining stage in the Z-axis direction in accordance with the position command. Each machining power supply unit 8 of the machining power supply 7 receives the voltage application command from the machining control device 9, and applies a machining pulse voltage between corresponding one of the cutting wire sections 6a and the workpiece 2 in accordance with the voltage application command.

Next, the configuration and operation of the learning system 20 will be described. Hereinafter, the configuration and operation (learning phase) of the learning device 50 will be described, and then the configuration and operation (utilization phase) of the inference device 60 will be described.

<Learning Phase>

Figure 3:
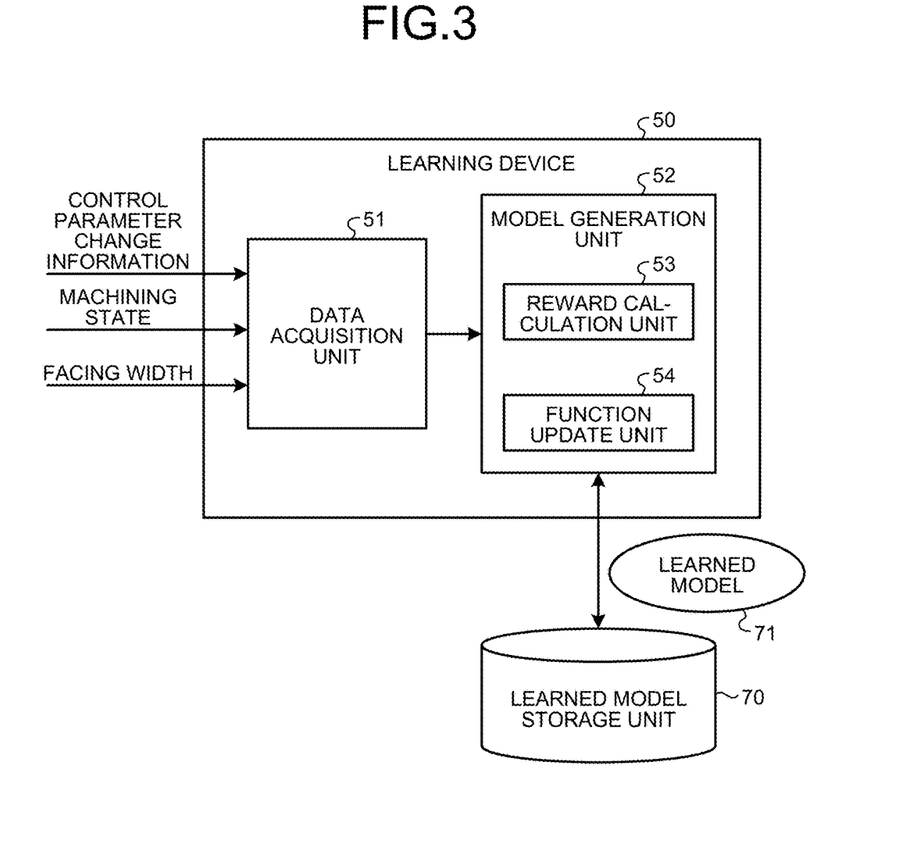
FIG. 3 is a diagram illustrating a configuration of a learning device according to the embodiment.

FIG. 3 is a diagram illustrating the configuration of the learning device according to the embodiment. The learning device 50 is a computer that learns a learned model 71 for providing a control parameter (control parameter change information) to be used by the machining control device 9. The learning device 50 includes a data acquisition unit 51 and a model generation unit 52. The data acquisition unit 51 serves as a first data acquisition unit.

The data acquisition unit 51 acquires, as learning data, control parameter change information on a control parameter to be used by the machining control device 9, machining states obtained from the machining-state detection device 15, and facing widths of the workpiece 2 and the cutting wire sections 6a output by the cutting width detection device 21. The data acquisition unit 51 acquires learning data for each cutting wire section 6a.

Examples of the control parameter to be used by the machining control device 9 and control parameter change information include a parameter included in a position command to be used to control the drive unit 14 and a parameter included in a voltage application command to be used to control the machining power supply unit 8. Examples of the parameter included in the position command include a parameter specifying an electrode gap distance between the workpiece 2 and the cutting wire section 6a. Examples of the parameter included in the voltage application command include the amplitude of voltage to be applied to the electrode gap between the workpiece 2 and each cutting wire section 6a, the frequency of machining pulse voltage, and the on-time of machining pulse voltage.

The control parameter change information refers to a value of a changed control parameter. Note that the control parameter change information may be the amount of change in the control parameter. Examples of the machining state obtained from the machining-state detection device 15 include the state of gap voltage, a current state, the number of times an electric discharge occurs per unit time, the number of times a short circuit occurs per unit time, a machining pulse voltage, the presence or absence of wire breakage, and machining speed.

The model generation unit 52 learns control parameter change information on a control parameter to be used by the machining control device 9, on the basis of the learning data including the control parameter change information on the control parameter to be used by the machining control device 9, the machining states obtained from the machining-state detection device 15, and the facing widths output by the cutting width detection device 21. That is, the model generation unit 52 generates the learned model 71 for inferring control parameter change information on the control parameter to be used by the machining control device 9 from a machining state obtained from the machining-state detection device 15 and a facing width output by the cutting width detection device 21.

The model generation unit 52 can use a known learning algorithm such as an algorithm of supervised learning, unsupervised learning, or reinforcement learning. A case where reinforcement learning is applied to the model generation unit 52 will be described as an example. In reinforcement learning, an agent (action subject) in a certain environment observes a current state (environmental parameter), and determines an action to be taken. The environment dynamically changes according to the action taken by the agent, and a reward is given to the agent according to the change in the environment. The agent repeats this process, and learns a course of action that maximizes the reward through a series of actions. Q-learning and TD-learning are known as typical methods for reinforcement learning. For example, in the case of Q-learning, a general update formula of an action-value function Q(s,a) is expressed by formula (1) below.

Formula 1:

$$Q(s_t, a_t) \leftarrow Q(s_t, a_t) + \alpha\left(r_{t+1} + \gamma\max_a Q(s_{t+1}, a) - Q(s_t, a_t)\right) \quad (1)$$

In formula (1), the symbol "$s_t$" denotes the state of the environment at time "t", and the symbol "$a_t$" denotes an action taken at time "t". The action "$a_t$" causes the state to shift to a state "$s_{t+1}$". The symbol "$r_{t+1}$" denotes a reward to be given according to a change in the state, the symbol "γ" denotes a discount rate, and the symbol "α" denotes a learning coefficient. Note that γ is in a range of 0<γ≤1, and a is in a range of 0<α≤1. The model generation unit 52 learns a best action "$a_t$" in the state "$s_t$" at time "t", where the action "$a_t$" corresponds to the control parameter change information on the control parameter to be used by the machining control device 9, and the state "$s_t$" corresponds to machining states obtained from the machining-state detection device 15 and facing widths of the workpiece 2 and the cutting wire sections 6a output by the cutting width detection device 21.

The update formula expressed by formula (1) increases an action value Q when the action value Q of the action "α" with a highest Q value at time "t+1" is larger than the action value Q of the action "α" taken at time "t", and decreases the action value Q in the opposite case. In other words, the action-value function Q(s,a) is updated such that the action value Q of the action "α" at time "t" approaches the best action value at time "t+1". As a result, the best action value in a certain environment is sequentially propagated to action values in the previous environments.

In a case where the learned model 71 is generated by reinforcement learning as described above, the model generation unit 52 includes a reward calculation unit 53 and a function update unit 54.

The reward calculation unit 53 calculates a reward "r" on the basis of the control parameter change information on a control parameter to be used by the machining control device 9, a machining state obtained from the machining-state detection device 15, and a facing width output by the cutting width detection device 21. The reward calculation unit 53 calculates the reward "r" on the basis of an aim of increasing machining speed while preventing wire breakage.

For example, in a case where machining speed decreases (in a case where a reward decrease criterion is satisfied), the reward calculation unit 53 decreases the reward "r" (for example, gives a reward of "−1"). In addition, the reward calculation unit 53 decreases the reward "r" in a case where wire breakage has occurred, or in a case where machining current exceeds a wire breakage threshold value, that is, in a case where the reward decrease criterion is satisfied.

Furthermore, when no wire breakage has occurred and machining speed has increased (when a reward increase criterion is satisfied), the reward calculation unit 53 increases the reward "r" (for example, gives a reward of "1"). Note that the reward calculation unit 53 may increase the reward "r" (for example, give a reward of "1") when machining current does not exceed the wire breakage threshold value and machining speed has increased.

The function update unit 54 updates a function for determining control parameter change information on the control parameter to be used by the machining control device 9, according to the reward "r" calculated by the reward calculation unit 53. Then, the function update unit 54 outputs the updated function to a learned model storage unit 70. For example, in the case of Q-learning, the function update unit 54 uses the action-value function $Q(s_t, a_t)$ expressed by formula (1) as a function for calculating the control parameter change information on the control parameter to be used by the machining control device 9.

The function update unit 54 repeatedly executes learning as described above. The learned model storage unit 70 stores the action-value function $Q(s_t, a_t)$ updated by the function update unit 54, that is, the learned model 71.

Figure 4:
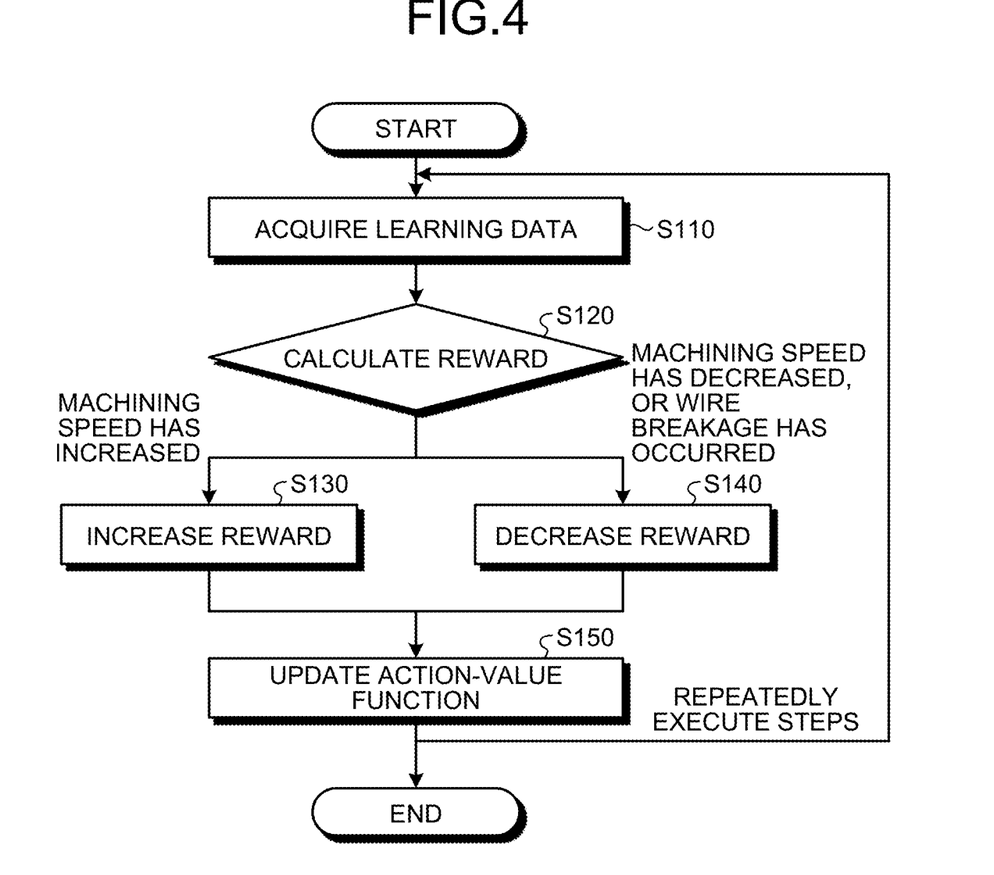
FIG. 4 is a flowchart illustrating a processing procedure of learning processing to be performed by the learning device according to the embodiment.

Next, a processing procedure of learning processing to be performed by the learning device 50 will be described with reference to FIG. 4. FIG. 4 is a flowchart illustrating a processing procedure of learning processing to be performed by the learning device according to the embodiment. The data acquisition unit 51 acquires, as learning data, control parameter change information on a control parameter to be used by the machining control device 9, a machining state obtained from the machining-state detection device 15, and a facing width of the workpiece 2 and the cutting wire section 6a output by the cutting width detection device 21 (step S110).

The model generation unit 52 calculates a reward based on the control parameter change information on the control parameter to be used by the machining control device 9, the machining state obtained from the machining-state detection device 15, and the facing width of the workpiece 2 and the cutting wire section 6a output by the cutting width detection device 21 (step S120).

Specifically, the reward calculation unit 53 acquires the control parameter change information, the machining state, and the facing width, and determines whether to increase the reward (step S130) or decrease the reward (step S140) on the basis of a predetermined aim of increasing machining speed while preventing wire breakage.

The reward calculation unit 53 increases the reward when determining that the reward should be increased (step S130). Meanwhile, the reward calculation unit 53 decreases the reward when determining that the reward should be decreased (step S140). The reward calculation unit 53 increases the reward in a case where machining speed has increased without causing wire breakage. In addition, the reward calculation unit 53 decreases the reward in a case where wire breakage has occurred or in a case where machining speed has decreased. Note that in a case where no wire breakage has occurred and there is no change in machining speed, the reward calculation unit 53 need not increase or decrease the reward.

The function update unit 54 updates the action-value function $Q(s_t, a_t)$ expressed by formula (1) stored in the learned model storage unit 70, on the basis of the reward calculated by the reward calculation unit 53 (step S150).

The learning device 50 repeatedly executes the above steps S110 to S150, and stores the generated action-value function $Q(s_t, a_t)$ as the learned model 71 in the learned model storage unit 70.

Note that the present embodiment is based on the assumption that the learning device 50 according to the embodiment stores the learned model 71 in the learned model storage unit 70 provided outside the learning device 50, but the learned model storage unit 70 may be provided inside the learning device 50.

<Utilization Phase>

Figure 5:
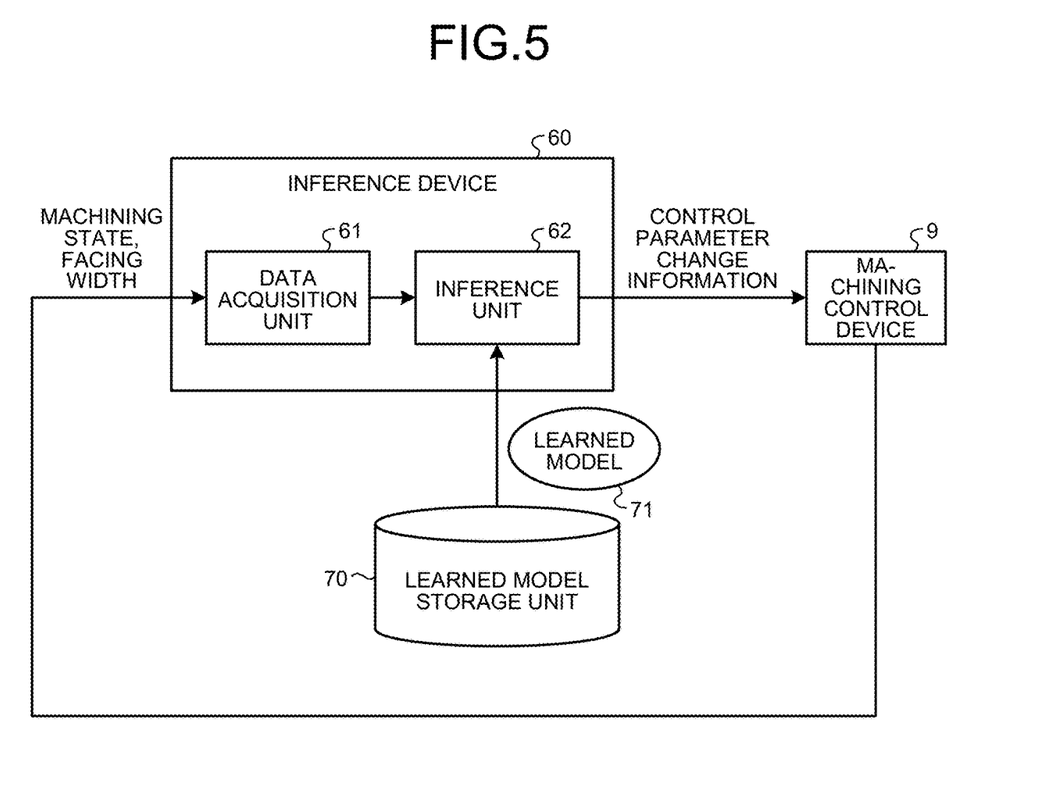
FIG. 5 is a block diagram illustrating a configuration of an inference device according to the embodiment.

FIG. 5 is a block diagram illustrating a configuration of the inference device according to the embodiment. The inference device 60 includes a data acquisition unit 61 and an inference unit 62. The data acquisition unit 61 serves as a second data acquisition unit.

The data acquisition unit 61 acquires a machining state obtained from the machining-state detection device 15 and a facing width of the workpiece 2 and the cutting wire section 6a output from the cutting width detection device 21.

The inference unit 62 infers control parameter change information on a control parameter to be used by the machining control device 9, by using the learned model 71 stored in the learned model storage unit 70. That is, as a result of inputting, to the learned model 71, the machining state and the facing width acquired by the data acquisition unit 61, the inference unit 62 can infer control parameter change information on the control parameter to be used by the machining control device 9, suitable for the machining state and the facing width. The control parameter change information to be inferred by the inference unit 62 corresponds to the target value of the machining state. The inference unit 62 outputs the obtained control parameter change information to the machining control device 9.

Note that the case where the inference device 60 uses the learned model 71 learned by the model generation unit 52 of the learning device 50 has been described in the present embodiment, but the inference device 60 may use a learned model 71 acquired from another learning device 50. Also in this case, the inference device 60 infers and outputs control parameter change information on a control parameter to be used by the machining control device 9, on the basis of the learned model 71 acquired from the another learning device 50. The another learning device 50 is a device that learns the learned model 71 from another multi-wire electric discharge machine different from the multi-wire electric discharge machine 1. That is, the inference device 60 may infer control parameter change information suitable for a machining state and a facing width by using the learned model 71 learned by the another multi-wire electric discharge machine.

Figure 6:
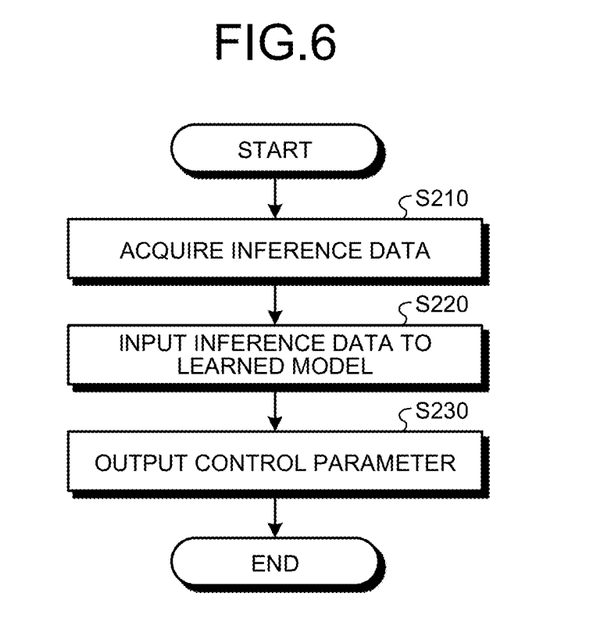
FIG. 6 is a flowchart illustrating a processing procedure of inference processing to be performed by the inference device according to the embodiment.

Next, a processing procedure of inference processing to be performed by the inference device 60 will be described with reference to FIG. 6. FIG. 6 is a flowchart illustrating a processing procedure of inference processing to be performed by the inference device according to the embodiment. The data acquisition unit 61 acquires inference data that are data for inferring control parameter change information on a control parameter to be used by the machining control device 9 (step S210). Specifically, the data acquisition unit 61 acquires a machining state obtained from the machining-state detection device 15 and a facing width of the workpiece 2 and the cutting wire section 6a output from the cutting width detection device 21.

The inference unit 62 inputs, to the learned model 71 stored in the learned model storage unit 70, the machining state obtained from the machining-state detection device 15 and the facing width of the workpiece 2 and the cutting wire section 6a output by the cutting width detection device 21 (step S220), and obtains control parameter change information on the control parameter to be used by the machining control device 9. The inference unit 62 outputs the obtained data, that is, the control parameter change information on the control parameter to be used by the machining control device 9, to the machining control device 9 (step S230).

Thereafter, the multi-wire electric discharge machine 1 executes electric discharge machining while preventing wire breakage, by using the control parameter change information output by the inference unit 62. The multi-wire electric discharge machine 1 executes electric discharge machining by using the control parameter change information learned such that machining speed increases without causing wire breakage. Therefore, it is possible to stabilize the machining process in multi-wire electric discharge machining. Thus, the multi-wire electric discharge machine 1 can improve machining speed while preventing wire breakage. Therefore, the multi-wire electric discharge machine 1 can perform multi-wire electric discharge machining with a high throughput.

Furthermore, the model generation unit 52 may learn control parameter change information on a control parameter to be used by the machining control device 9, by using learning data acquired from a plurality of multi-wire electric discharge machines. Note that the model generation unit 52 may acquire learning data from a plurality of multi-wire electric discharge machines being used in the same area, or may learn control parameter change information on a control parameter to be used by the machining control device 9 by using learning data collected from a plurality of multi-wire electric discharge machines operating independently in different areas. Furthermore, in the course of the learning process, a multi-wire electric discharge machine may be added to or excluded from a plurality of multi-wire electric discharge machines from which learning data are collected. Moreover, a learning device that has learned control parameter change information on a control parameter to be used by the machining control device 9 for a certain multi-wire electric discharge machine may be applied to another multi-wire electric discharge machine, and may update a learned model based on relearning of the control parameter change information on the control parameter to be used by the machining control device 9 for the another multi-wire electric discharge machine.

Here, hardware configurations of the learning device 50 and the inference device 60 will be described. Since the learning device 50 and the inference device 60 have similar hardware configurations, the hardware configuration of the learning device 50 will be described below.

Figure 7:
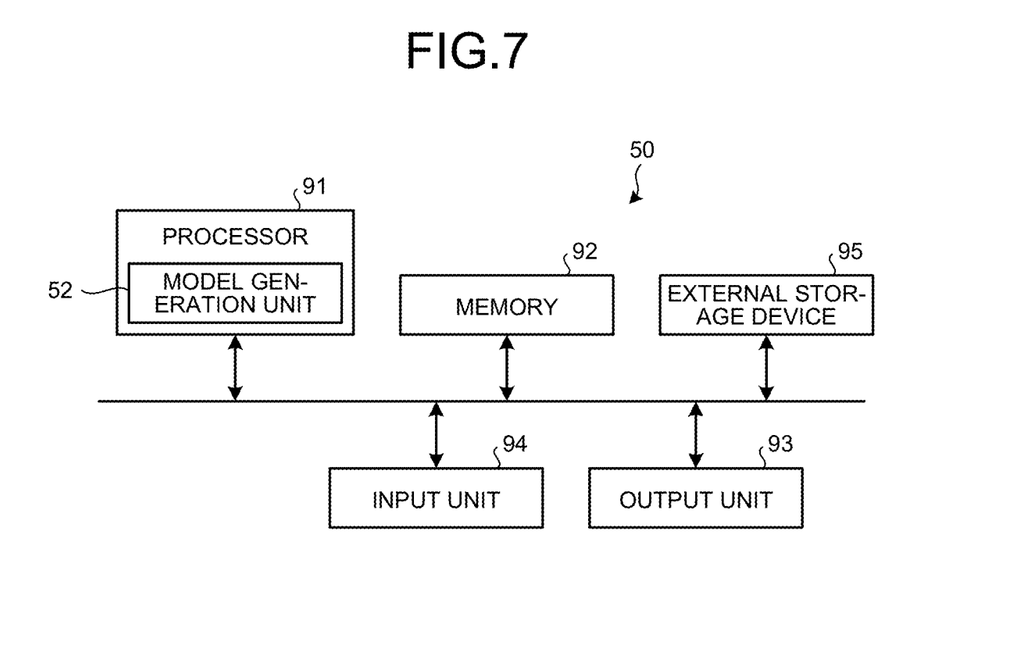
FIG. 7 is a diagram showing an example of a hardware configuration for implementing the learning device according to the embodiment.

FIG. 7 is a diagram showing an example of a hardware configuration for implementing the learning device according to the embodiment. The learning device 50 can be implemented by a processor 91, a memory 92, an output unit 93, an input unit 94, and an external storage device 95.

Each function of the learning device 50 is implemented by use of a computer system such as a personal computer or a general-purpose computer.

The learning device 50 includes the processor 91, the memory 92, the external storage device 95, the input unit 94, and the output unit 93. The processor 91 executes various types of processing. The memory 92 is a built-in memory. The external storage device 95 stores various types of information. The input unit 94 acquires information input by an operator, and the like. The output unit 93 presents various types of information to the operator.

Examples of the processor 91 include a central processing unit (CPU) and a system large scale integration (LSI). The processor 91 may be a central processing unit, a processing unit, an arithmetic unit, a microprocessor, a microcomputer, or a digital signal processor (DSP).

The memory 92 is a nonvolatile or volatile semiconductor memory. Examples of the memory 92 include a random access memory (RAM), a read only memory (ROM), a flash memory, an erasable programmable read only memory (EPROM), and an electrically erasable programmable read only memory (EEPROM (registered trademark)). The external storage device 95 is a hard disk drive (HDD) or a solid state drive (SSD). In addition, the memory 92 is used as a temporary memory when the processor 91 executes various types of processing.

Each function of the learning device 50 is implemented by the processor 91, and software, firmware, or a combination of software and firmware. The software or firmware is described as a program, and stored in the external storage device 95. The processor 91 reads software or firmware stored in the external storage device 95 into the memory 92, and executes the software or firmware. That is, the learning device 50 is implemented by the processor 91 reading and executing learning programs for implementing operation of the learning device 50. The learning programs are stored in the memory 92, and can be executed by a computer. It can also be said that the learning programs for implementing operation of the learning device 50 each cause a computer to execute a procedure or a method of the learning device 50. The learning programs for implementing operation of the learning device 50 include a program for learning control parameter change information, and the like.

The input unit 94 includes an input device typified by an input key and a pointing device. The input unit 94 acquires information input by the operator of the multi-wire electric discharge machine 1, and sends the acquired information to the processor 91. In addition, the input unit 94 receives control parameter change information sent from the machining control device 9, a machining state sent from the machining-state detection device 15, and a facing width sent from the cutting width detection device 21, and sends the received information and data to the processor 91.

The output unit 93 includes an output device typified by a liquid crystal display (LCD) and a speaker. The output unit 93 may be a touch screen integrally formed with a pointing device included in the input unit 94. The output unit 93 presents various types of information to the operator in accordance with an instruction from the processor 91. Furthermore, the output unit 93 also sends the control parameter change information to the machining control device 9.

The learning programs to be executed by the learning device 50 are modularly configured in such a way as to include the model generation unit 52. These learning programs are loaded on a main storage device to generate such modules on the main storage device.

The learning programs may be stored as a file in an installable format or an executable format on a computer-readable storage medium, and provided as a computer program product. Furthermore, the learning programs may be provided to the learning device 50 via a network such as the Internet. Note that some of the functions of the learning device 50 may be implemented by dedicated hardware such as a dedicated circuit, and some of the other functions thereof may be implemented by software or firmware. Note that the machining control device 9 also has a hardware configuration similar to that of the learning device 50.

Here, devices of comparative examples will be described. In order to prevent a machining process from becoming unstable, a first device of a comparative example detects voltages of a plurality of cutting wire sections, and adjusts machining speed by adjusting the relative positional relationship between a workpiece and the cutting wire sections from the detected voltages. The first device of this comparative example has the following problem.

That is, the first device of the comparative example adjusts a machining control system by changing the relative positional relationship between the workpiece and the cutting wire sections. Accordingly, only a machining phenomenon in a drivable frequency band of, for example, several tens of Hz or less can be improved. Therefore, it is difficult for the first device of the comparative example to detect and control a sign of wire breakage in electric discharge machining that is an electric phenomenon in a frequency band of about several kHz to several MHz, which is a frequency band higher than an operation frequency band of a drive system.

A second device of another comparative example includes a wire breakage detection means and a learning device that predicts wire breakage. The learning device predicts wire breakage, and controls a machining condition. Thus, the second device prevents wire breakage. The second device of the another comparative example has the following problem.

That is, in the second device of the another comparative example, it is necessary for an operator to create a machining condition for preventing wire breakage. Therefore, the operator needs to be skilled so as to create a condition for obtaining a high throughput. Furthermore, in the cutting of a semiconductor ingot, the facing width of a workpiece and a cutting wire changes depending on a machining position. Therefore, in order for the second device of the another comparative example to improve machining speed while avoiding wire breakage, it is necessary to create a machining condition according to the facing width of the workpiece and the cutting wire. Thus, the second device has a problem in that creation of the machining condition is extremely complicated.

As described above, according to the embodiment, when a value indicating a machining state exceeds the threshold value, the machining control device 9 outputs, to the machining power supply 7, a voltage application command according to a machining condition for avoiding breakage of the wire electrode 6, so that it is possible to increase machining speed while avoiding wire breakage. Therefore, the multi-wire electric discharge machine 1 can obtain a high throughput.

In addition, the machining control device 9 outputs, to the machining power supply 7, a voltage application command that causes the value indicating the machining state to approach a target value of the machining state. It is thus possible to increase machining speed while avoiding wire breakage. Therefore, the multi-wire electric discharge machine 1 can obtain a high throughput.

The configurations set forth in the above embodiment show examples, and it is possible to combine the configurations with another technique that is publicly known, and is also possible to partially omit or change the configurations without departing from the scope of the present disclosure.

REFERENCE SIGNS LIST 1 multi-wire electric discharge machine; 2 workpiece; 3a to 3d guide roller; 4 wire bobbin; 5 wire ejection roller; 6 wire electrode; 6a cutting wire section; 6b power-supply wire section; 7 machining power supply; 8 machining power supply unit; 9 machining control device; 10 ground electrode; 11 cable; 12 power feeder; 13 power feeder unit; 14 drive unit; 15 machining-state detection device; 16 machining-state detection unit; 17 wire bobbin drive unit; 18 guide roller drive unit; 20 learning system; 21 cutting width detection device; 50 learning device; 51 data acquisition unit; 52 model generation unit; 53 reward calculation unit; 54 function update unit; 60 inference device; 61 data acquisition unit; 62 inference unit; 70 learned model storage unit; 71 learned model; 91 processor; 92 memory; 93 output unit; 94 input unit; 95 external storage device.

The invention claimed is:

1. A multi-wire electric discharge machine comprising:
a plurality of cutting wire sections arranged in parallel in such a way as to face a workpiece, a wire electrode being wound around a plurality of guide rollers to form the cutting wire sections;
a driver to adjust relative distances between the workpiece and the cutting wire sections;
a machining power supply to apply pulse voltages between the workpiece and the cutting wire sections;
a machining-state detector to detect machining states in the cutting wire sections;
a machining controller to control the driver and the machining power supply;
a first data acquisition circuitry to acquire learning data including the machining states, facing widths of the cutting wire sections and the workpiece, and control parameter change information on a control parameter changed by the machining controller in the machining states and the facing widths; and
a model generation circuitry to generate a learned model by using the learning data, the learned model being for inferring the control parameter change information from the machining states and the facing widths, wherein
when values indicating the machining states exceed a threshold value, the machining controller outputs, to the machining power supply, commands to apply the pulse voltages according to a machining condition for avoiding breakage of the wire electrode.

2. The multi-wire electric discharge machine according to claim 1, further comprising:
a second data acquisition circuitry to acquire the machining states and the facing widths; and
an inference circuitry to infer the control parameter change information from the machining states and the facing widths acquired by the second data acquisition circuitry, by using the learned model, wherein
the machining controller controls the machining power supply by using the control parameter change information inferred by the inference circuitry.

3. The multi-wire electric discharge machine according to claim 1, wherein
the machining state is machining energy calculated from a value of current flowing through an electrode gap between the workpiece and the cutting wire section.

4. The multi-wire electric discharge machine according to claim 1, wherein
the machining-state detector detects the machining state for each of the cutting wire sections, and
the machining controller controls the machining power supply for each of the cutting wire sections.

5. A multi-wire electric discharge machine comprising:
a plurality of cutting wire sections arranged in parallel in such a way as to face a workpiece, a wire electrode being wound around a plurality of guide rollers to form the cutting wire sections;
a driver to control relative distances between the workpiece and the cutting wire sections;
a machining power supply to apply pulse voltages between the workpiece and the cutting wire sections;
a machining-state detector to detect machining states in the cutting wire sections;
a machining controller to control the driver and the machining power supply; and
a cutting width detector to estimate facing widths of the cutting wire sections and the workpiece, wherein
the machining controller changes the target values of the machining states based on the facing widths detected by the cutting width detector, and outputs, to the machining power supply, commands to apply the pulse voltages for causing values indicating the machining states to approach target values of the machining states.

6. The multi-wire electric discharge machine according to claim 5, further comprising:
- a first data acquisition circuitry to acquire learning data including the machining states, facing widths of the cutting wire sections and the workpiece, and control parameter change information on a control parameter changed by the machining controller in the machining states and the facing widths; and
- a model generation circuitry to generate a learned model by using the learning data, the learned model being for inferring the control parameter change information from the machining states and the facing widths.

7. The multi-wire electric discharge machine according to claim 5, further comprising:
- a second data acquisition circuitry to acquire the machining states and the facing widths; and
- an inference circuitry to infer the control parameter change information from the machining states and the facing widths acquired by the second data acquisition circuitry, by using the learned model, wherein the machining controller controls the machining power supply by using the control parameter change information inferred by the inference circuitry.

8. The multi-wire electric discharge machine according to claim 5, wherein
the machining state is machining energy calculated from a value of current flowing through an electrode gap between the workpiece and the cutting wire section.

9. The multi-wire electric discharge machine according to claim 5, wherein
the machining-state detector detects the machining state for each of the cutting wire sections, and
the machining controller controls the machining power supply for each of the cutting wire sections.

* * * * *